May 27, 1930.  C. R. HARDY  1,760,355
AUTOMATIC CONTROL VALVE
Filed Sept. 8, 1927

INVENTOR.
Charles R. Hardy.
BY
ATTORNEY.

Patented May 27, 1930

1,760,355

UNITED STATES PATENT OFFICE

CHARLES R. HARDY, OF MOUNT VERNON, NEW YORK, ASSIGNOR TO THE SUPERHEATER COMPANY, OF NEW YORK, N. Y.

AUTOMATIC CONTROL VALVE

Application filed September 8, 1927. Serial No. 218,289.

My invention relates to control valves and has for its general object the provision of a valve for automatically preventing the starting of a fluid pressure driven pumping unit when the latter is not properly loaded, and for automatically stopping such a unit when during operation the load thereon fails.

The invention is particularly applicable to turbine-driven centrifugal pumps in order to prevent destructive overspeeding when the water supply thereto fails, and I have chosen for illustrative purposes an application of my invention to a pumping unit of this class used as a locomotive feed pump. It is to be clearly understood, however, that the invention is not to be limited in any sense to the illustrative embodiment, but is equally applicable to any form of apparatus of this kind which it is desired to control.

Figure 2:
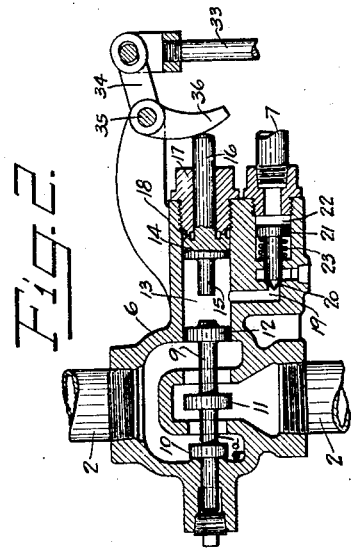
Figure 3:
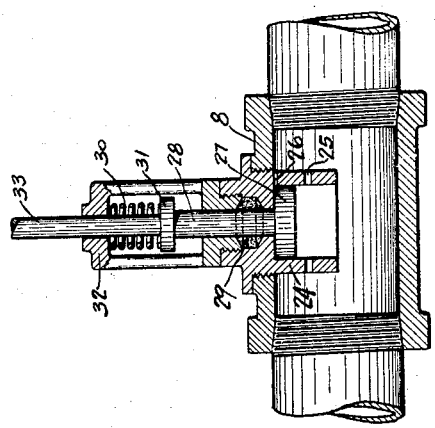
Figure 1:
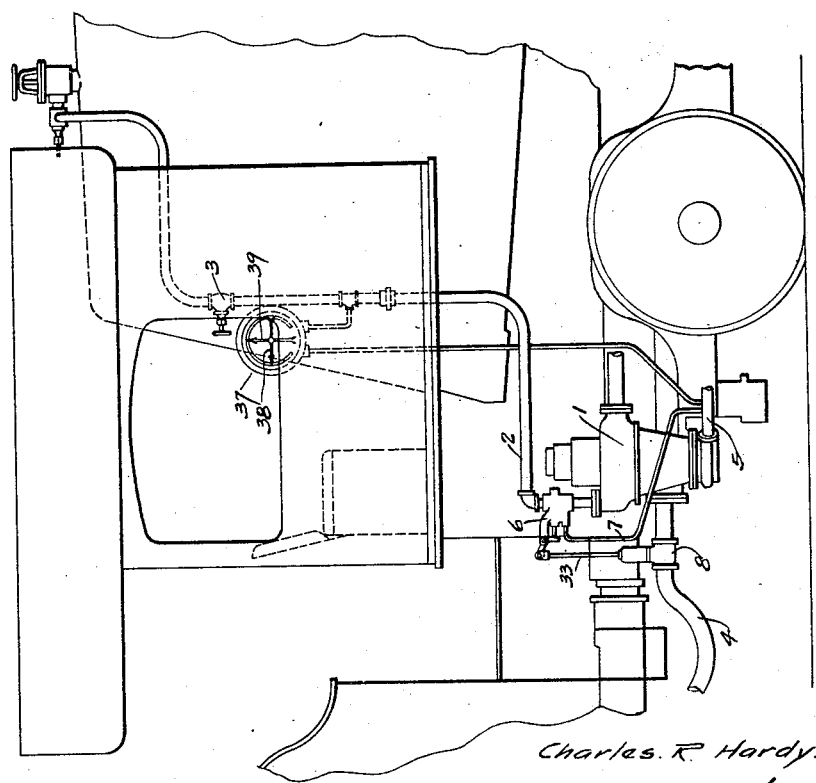

The more detailed objects of the invention and the advantages to be derived from its use will become apparent from the following description of a preferred form of my invention illustrated in the accompanying drawings in which Fig. 1 is a fragmentary elevation of a locomotive feed pump installation equipped with my invention; Fig. 2 is a fragmentary section on a larger scale illustrating one portion of the control valve, and Fig. 3 is a section through another portion of the mechanism.

Referring now to Fig. 1, I have shown at 1 a turbine-driven centrifugal pumping unit supplied with steam from the locomotive boiler through the conduit 2 and controlled by the throttle 3 located convenient to the operator in the locomotive cab. Water is supplied to the pump through the suction line 4 and is delivered under pressure through conduit 5 to the check valve (not shown) of the boiler.

The control valve comprises a valve mechanism shown generally at 6, located in the steam supply conduit 2 between the throttle 3 and the turbine. A conduit 7 leads from the discharge conduit 5 of the pump to the control valve 6, and the latter is mechanically connected to a dash-pot 8 located in the suction line 4 leading to the pump.

As shown in Fig. 2, the control valve 6 comprises a suitably ported casing in which there is located the sliding valve member 9, said member comprising a stem $9^a$, upon which are mounted pistons 10, 11 and 12. The valve member 9 is loosely supported in the valve casing by the piston 12 at one end and the stem $9^a$ at the other end, and pistons 10 and 11 forming the valve proper are adapted to close the ports in the valve casing to close the conduit 2. Piston 11 is the same diameter as piston 12 and piston 10 is of a smaller diameter. The valve casing is extended to form a chamber 13 beyond the piston 12 and in this chamber there is slidably mounted the piston 14 having a stem 15 extending toward piston 12 and a second stem 16 extending through the cap 17 to the exterior of the valve casing. Piston 14 is formed with a suitable annular seat 18 engaging a corresponding seat on cap 17 to prevent steam leakage around the stem 16 when the piston is in the position shown in the figure. Chamber 13 is vented to the atmosphere through passage 19 which is formed with a valve seat 20 intermediate its ends, against which a piston operated valve member 21 is adapted to seat to close the passage 19. The piston of valve member 21 is located in a suitable chamber 22, which is placed in communication with the discharge side of the pump through the conduit 7. The discharge pressure from the pump acting on the piston of the valve member 21 serves to close the passage 19 and a spring 23 moves the valve member 21 to open position upon the release of pressure from chamber 22.

The dashpot 8 shown in Fig. 3 comprises a cylindrical casing carrying a dashpot cylinder 24 projecting into the interior of the casing, and provided with ports 25 near the bottom of the cylinder and a small leak port 26 at the top of the cylinder. A piston 27 is mounted in the cylinder 24 and carries a stem 28 projecting through a suitable stuffing box 29 to the exterior of the casing. A spring 30, retained between a collar 31 on stem 28 and a suitable spider 32, tends to force the piston 27 downward to a point in the cylinder 24 just below the ports 25.

The piston stem 28 is connected by means of rod or other equivalent mechanical connection with the arm 34 of a bell crank suitably pivoted as at 35 on the valve casing and provided with a cam-like arm 36 which engages the extended end of the piston stem 16.

When assembled, the length of the connection 33 is such that when the piston 14 is in the position shown in Fig. 2 the piston 27 will be in the position shown in Fig. 3.

The operation of the device is as follows: Assuming the pump not in operation, and water present in the suction line 4, the position of the pistons 14 and 27 will be opposite that shown in the figures, due to the action of spring 30 forcing piston 27 to the bottom of its stroke, and through the bell crank connection pushing piston 14 to the left until it engages the valve member 9. Piston 21 will also be at the right hand end of its stroke because of the action of spring 23, leaving the passage 19 open to atmosphere. Upon opening the throttle 3 to start the pump, the admission of steam to the control valve will tend to move the latter to its closed position because of the unbalanced pressures exerted on pistons 10, 11 and 12. In order to close the valve, however, this unbalanced steam pressure must overcome the resistance of piston 27 which, if water is present in the pump suction line, can be lifted only by forcing the water trapped above ports 25 through the small leak port 26. This resistance delays the closing of the valve member 9 and during the period before the valve can close, steam passes therethrough and starts the pump. The delivery pressure built up by the pump before valve member 9 can close is transmitted through conduit 7 to the piston valve 21, forces the latter to the position shown in Fig. 2, and closes the vent passage 19. As previously noted, the piston 12 is a loose fit in the valve casing and steam leaking past this piston is, upon the closing of the valve member 21, trapped in the chamber 13, thereby equalizing the steam pressures exerted on piston 12. While it would appear at first glance that the building up of full steam pressure in chamber 13 would overbalance piston 12 toward the left, because of the apparent greater effective area of the right-hand face of piston 12 as compared with the left-hand face, this is not the case, as the effective area of the right-hand face of piston 12 is only the area represented by the total area of the right-hand face minus the projected area of the valve member stem $9^a$. As will be apparent from the construction shown in Fig. 2, steam at high pressure will at all times, when admitted to the valve, leak through the bearing supporting the left-hand end of valve member 9, and exert a pressure on the left-hand end of valve stem $9^a$. Thus it will be seen that the piston 12 is balanced when pressure is built up in chamber 13, whether the piston be considered only as the annulus extending beyond the diameter of stem $9^a$ or as the entire disc. In the latter case, the left-hand end of stem $9^a$ must be considered as a portion of the effective area of the left-hand face of piston 12. With the piston 12 balanced, the resultant unbalanced pressure acting on pistons 10 and 11 moves and holds the valve member in open position. The building up of pressure in chamber 13, in addition to balancing the piston 12, also acts to move piston 14 to its seat at the right-hand end of the chamber, as shown in Fig. 2, thus preventing the leakage of steam to atmosphere past the stem 16. This represents the normal running condition of the pump and the normal operating position of the control valve.

Assuming that the pump is operating under normal conditions with the valve elements in the position shown in Figs. 2 and 3, a failure in the water supply to the pump will cause the discharge pressure therefrom to fall and relieve the pressure on the valve member 21. Under the influence of the pressure in chamber 13 and the action of the spring 23, the valve member 21 is moved to open position, venting chamber 13 through passage 19 and changing the pressure conditions operating on valve member 9 by unbalancing the piston 12. With the piston 12 unbalanced the valve member 9 is immediately moved to closed position by the steam admitted thereto through the main supply conduit 2, and this action can take place substantially instantly, due to the fact that in the normal running position the piston 14 is in the position shown in Fig. 2 and the stem 15 is out of contact with the main valve member 9, leaving the latter free to shift.

If it is attempted to start the pump when there is no water available, the opening of throttle 3 admitting steam to the valve member 9 tends to close the latter because of the unbalanced pressures acting thereon. The movement of the valve from open to closed position is resisted only by the spring 30, as the absence of water in the pump suction line eliminates substantially all of the resistance normally exerted by the piston 27. The effect of this lack of resistance is to permit the valve member 9 to move rapidly to closed position under the influence of unbalanced pressure, and it remains in this position because of the fact that the lack of pump discharge pressure leaves the vent passage 19 open to the atmosphere so that the piston 12 remains unbalanced.

After unsuccessfully attempting to start the pump, the throttle 3 should be closed by the operator and the consequent relieving of the pressure on the valve member 9 due to condensation in the steam line permits the dashpot piston 27 to be forced downward and the piston 14 to the left, thereby opening the main valve, by the action of spring 30.

I prefer to use in conjunction with my invention a compound gauge such as is shown at 37 in Fig. 1. The gauge comprises an indicator hand 38 registering the pressure of steam admitted to the pump turbine and a second hand 39 registering the pump discharge pressure. When the pump is started under normal conditions, the hand 39 will rise to a pressure slightly above boiler pressure as the pump begins to feed to the boiler, and the hand 38 will simultaneously rise to a point somewhere below boiler pressure, the latter hand giving an approximate indication of the capacity at which the pump is operating. Upon attempting to start the pump without water or upon the failure of the water supply, the hand 39 will register zero, while the hand 38 will move to a point approximately equal to boiler pressure, thus giving the operator immediate notice of the fact that water is not available at the pump. In this event the throttle 3 should be closed, and the proper steps taken to restore the water supply to the pump.

It will be obvious to those skilled in the art that many changes may be made in the apparatus as herein disclosed without departing from the invention, which is to be considered as embracing all that may fall within the scope of the appended claims.

I claim:

1. The combination with a steam driven pumping unit having a steam supply conduit, of a control valve located in said conduit and urged to closed position by the resultant force exerted thereon by steam admitted thereto, means dependent upon the presence of water at the suction side of the pump for delaying the closing of said valve, and means actuated by delivery pressure from the pump for changing the resultant force exerted on said valve to open it.

2. The combination with a steam driven pumping unit having a steam supply conduit, a pump suction line and a pump delivery line, of a control valve located in said conduit and urged to closed position by the resultant force exerted thereon by steam admitted thereto, a dash-pot located in the pump suction line and operatively associated with said valve to delay its closing, and means actuated by delivery pressure from the pump for changing the resultant force exerted on said valve to open it.

3. In an automatic control valve, a casing forming a chamber, a main valve member located in said casing and having a piston loosely mounted in said chamber to permit steam admitted to said valve to pass to said chamber, said valve member being constructed and arranged so that a closing pressure is exerted thereon in a closing direction by steam admitted thereto when said piston is unbalanced, and to be opened by steam admitted thereto when said piston is balanced, a passage for venting said chamber, and means operating in response to a predetermined condition in the mechanism controlled to close said passage.

4. In an automatic control valve, a casing forming a chamber, a main valve member located in said casing and having a piston loosely mounted in said chamber to permit steam admitted to said valve to pass to said chamber, said valve member being constructed and arranged so that a closing pressure is exerted thereon in a closing direction by steam admitted thereto when said piston is unbalanced, and to be opened by steam admitted thereto when said piston is balanced, a passage for venting said chamber, means operating in response to a predetermined condition in the mechanism controlled to close said passage, and means for delaying the closing of said valve to permit said mechanism to actuate said first-named means.

5. In an automatic control valve, a casing forming a chamber, a main valve member located in said casing and having a piston loosely mounted in said chamber to permit steam admitted to said valve to pass to said chamber, said valve member being constructed and arranged so that a closing pressure is exerted thereon in a closing direction by steam admitted thereto when said piston is unbalanced, and to be opened by steam admitted thereto when said piston is balanced, a passage for venting said chamber, means operating in response to a predetermined condition in the mechanism controlled to close said passage, and resilient means for holding said valve in open position when steam is not admitted thereto.

CHARLES R. HARDY.